(12) United States Patent
Kimura et al.

(10) Patent No.: US 7,196,443 B2
(45) Date of Patent: Mar. 27, 2007

(54) ROTARY ELECTRIC MACHINE

(75) Inventors: Kiyoshi Kimura, Kariya (JP); Shigeru Yoshiyama, Kariya (JP); Masashi Hori, Nukata-gun (JP)

(73) Assignee: Denso Corporation (JP)

( * ) Notice: Subject to any disclaimer, the term of this patent is extended or adjusted under 35 U.S.C. 154(b) by 238 days.

(21) Appl. No.: 10/615,784

(22) Filed: Jul. 10, 2003

(65) Prior Publication Data

US 2004/0007935 A1    Jan. 15, 2004

(30) Foreign Application Priority Data

Jul. 11, 2002    (JP) .............................. 2002-203208

(51) Int. Cl.
*H02K 19/10*    (2006.01)

(52) U.S. Cl. .................. 310/71; 310/43; 310/49 R; 310/68 B; 310/218; 29/596; 29/598

(58) Field of Classification Search .................. 310/42, 310/43, 58, 59, 49 R, 68 B, 71, 218, 254; 29/596, 598
See application file for complete search history.

(56) References Cited

U.S. PATENT DOCUMENTS

| | | | | |
|---|---|---|---|---|
| 4,287,446 A | * | 9/1981 | Lill et al. ...................... 310/71 |
| 4,492,344 A | * | 1/1985 | Baumann et al. ......... 242/432.6 |
| 4,689,023 A | * | 8/1987 | Strong et al. ................ 439/189 |
| 4,934,041 A | * | 6/1990 | Hoover et al. ................ 29/596 |
| 5,001,379 A | * | 3/1991 | Katayama ................... 310/194 |
| 5,331,240 A | * | 7/1994 | Hyodo ........................ 310/71 |
| 5,770,902 A | * | 6/1998 | Batten et al. ................. 310/71 |
| 6,091,172 A | * | 7/2000 | Kakinuma et al. ............ 310/71 |
| 6,445,097 B1 | * | 9/2002 | Zeiler et al. ................... 310/71 |
| 6,566,779 B2 | * | 5/2003 | Takano et al. .............. 310/214 |
| 6,701,604 B2 | * | 3/2004 | Zeiler et al. ................... 29/596 |

FOREIGN PATENT DOCUMENTS

| | | | |
|---|---|---|---|
| JP | 2-30254 | | 2/1990 |
| JP | 06233483 A | * | 8/1994 |
| JP | 09023629 A | * | 1/1997 |
| JP | 09-331694 | | 12/1997 |
| JP | 10-336979 | | 12/1998 |
| JP | 11-018346 | | 1/1999 |
| JP | 11-356006 | | 12/1999 |

OTHER PUBLICATIONS

Japanese Office Action issued on Sept. 21, 2006 in the corresponding JP Patent Application No. 2002-203208 with English translation.

* cited by examiner

*Primary Examiner*—Darren Schuberg
*Assistant Examiner*—David W. Scheuermann
(74) *Attorney, Agent, or Firm*—Nixon & Vanderhye PC

(57) ABSTRACT

In a rotary electric machine, each stator coil includes a bobbin that is fitted to one of teeth of a stator core and a phase coil is wound around the bobbin. Each bobbin includes a bobbin terminal for connecting opposite ends of the phase coil. A stator housing includes an insert mold and a plurality of stator terminals embedded in the insert mold to be connectable to an outside electric device. Each stator terminal has a first contact portion and each bobbin terminal has a second contact portion in contact with the first contact portion when the stator core is accommodated in the stator housing.

14 Claims, 20 Drawing Sheets

(A) REVERSE ROTATION (B) NORMAL ROTATION

FIG. 9A  FIG. 9B
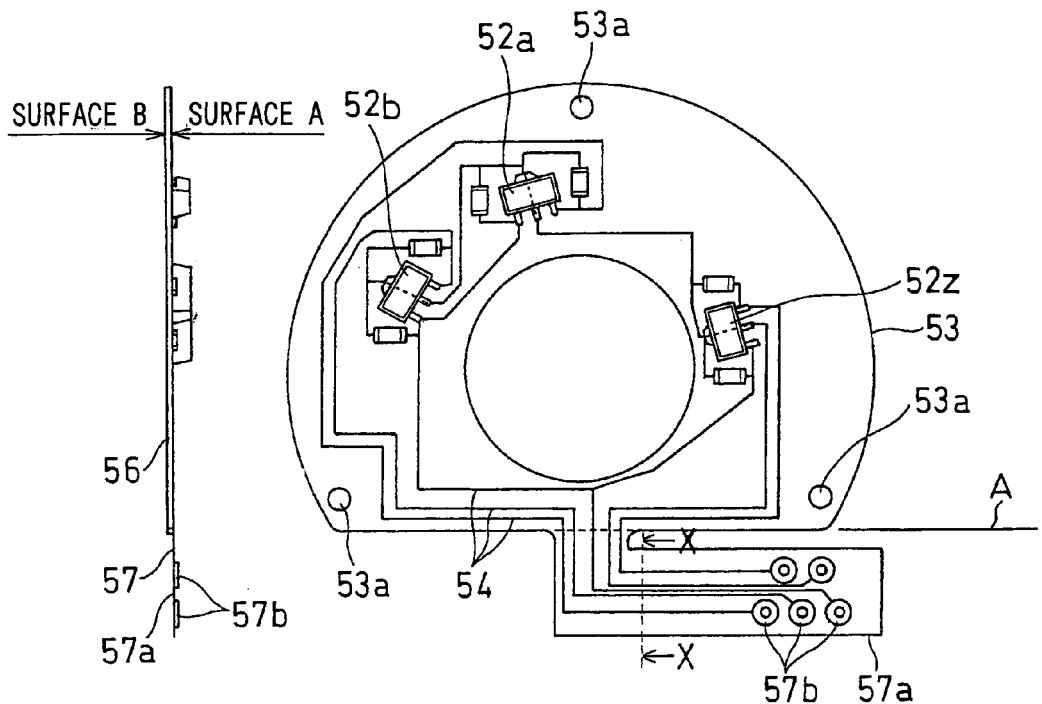
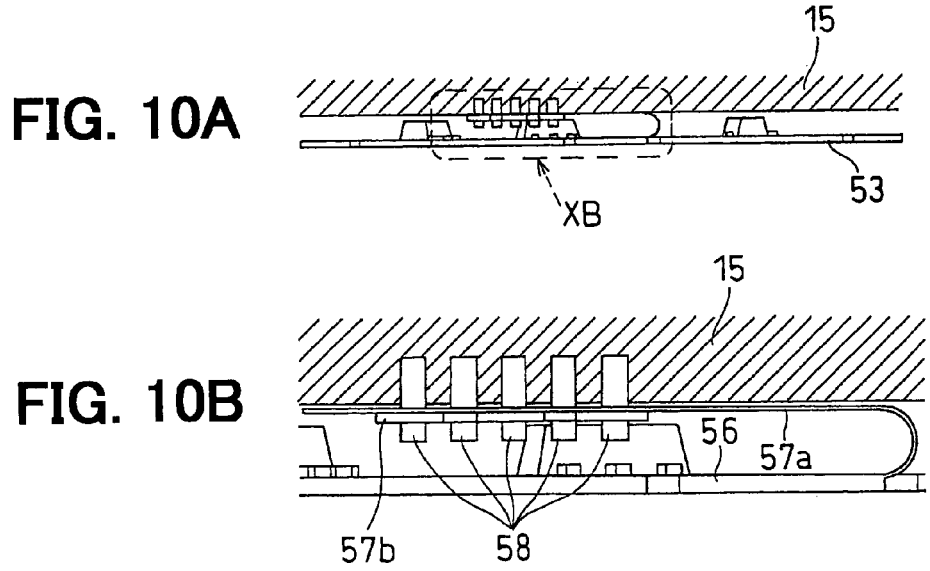
FIG. 10A
FIG. 10B

ROTARY ELECTRIC MACHINE

CROSS REFERENCE TO RELATED APPLICATION

The present application is based on and claims priority from Japanese Patent Application 2002-203208, filed Jul. 11, 2002, the contents of which are incorporated herein by reference.

BACKGROUND OF THE INVENTION

1. Field of the Invention

The present invention relates to an rotary electric machine, such as a motor or a generator and, particularly, a stator and a stator housing of the rotary electric machine.

2. Description of the Related Art

The stator of a known rotary electric machine is constituted of a plurality of stator teeth and a plurality of stator coils of an enameled wire that is directly wound the teeth. Usually, the ends of the stator coils are collected or bundled to be connected to a connector to be connected to an outside device. However, it is not easy to directly wind the enameled wire around a plurality of teeth, and, therefore, the ratio (space factor) of the space occupied by the coils to the whole available space around the stator teeth is not satisfactorily high.

SUMMARY OF THE INVENTION

The present invention has been made to provide a rotary electric machine that is easy to mount the stator coils on the teeth at a satisfactorily high space ratio.

According to a main feature of the invention, a rotary electric machine includes a stator including a stator core having a plurality of teeth and stator coils mounted on the teeth and a stator housing for accommodating the stator. Each stator coil includes a bobbin that is fitted to one of the teeth and a phase coil wound around the bobbin. Each bobbin includes a bobbin terminal for connecting opposite ends of the phase coil. The stator housing includes an insert mold and a plurality of stator terminals embedded in the insert mold to be connectable to an outside electric device. Each stator terminal has a first contact portion, and each bobbin terminal has a second contact portion in contact with the first contact portion when the stator is accommodated in the stator housing.

Therefore, it is very easy to manufacture a rotary electric machine having stator coils of a satisfactorily high space ratio.

According to another feature of the invention that is provided with the above feature, each bobbin has a terminal groove in which one of the stator terminals is inserted when the stator is accommodated in the stator housing. Preferably, each terminal groove has an end opening wide to receive one of the stator terminals. Therefore, the stator terminal can be smoothly inserted into the terminal groove.

According to another feature of the invention that is provided with the above feature, a plurality of the stator terminals is assembled into a resinous frame, which is embedded in the insert mold.

According to another additional feature of the invention, the stator housing further includes a resinous frame embedded in the insert mold to hold the plurality of stator terminals and a metal reinforcement plate for supporting a ball bearing that rotatably supports an end of said rotor. Therefore, a very strong stator housing can be provided. This structure can reduce the air gap between the rotor and the stator, whereby the output power of the rotary electric machine is increased.

According to a further feature of the invention, the stator housing has a center bore for supporting the ball bearing, and the center bore has an inside surface the diameter of which is formed with reference to one of an outside diameter and inside diameter of the stator. Therefore, an accurate air gap between the rotor 6 and the stator 7 can be formed.

According to another feature of the invention, the stator coils includes a first coil group including phase coils disposed in a circumferential direction and a second coil group including phase coils disposed in a circumferential direction, and the stator terminals includes a first terminal group and a second terminal group that are disposed to be symmetric to each other with respect to a diametric line of a contour of the assembled stator terminals. Therefore, the stator terminals of each group can be punched out by the same mold tools.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 9A is a schematic plan view of a printed board, and FIG. 9B is a side view of the printed circuit board;

FIG. 10A is a cross-sectional side view of the printed circuit board with sensor terminals, and FIG. 10B is an enlarged view of the main portion of FIG. 10A;

DETAILED DESCRIPTION OF THE PREFERRED EMBODIMENTS

A rotary electric machine according to a preferred embodiment of the invention will be described with reference to the appended drawings.

The rotary electric machine is applied to a gearshift control unit that includes a gear shift mechanism and a parking mechanism to provide torque for gear shifting.

Figure 2:
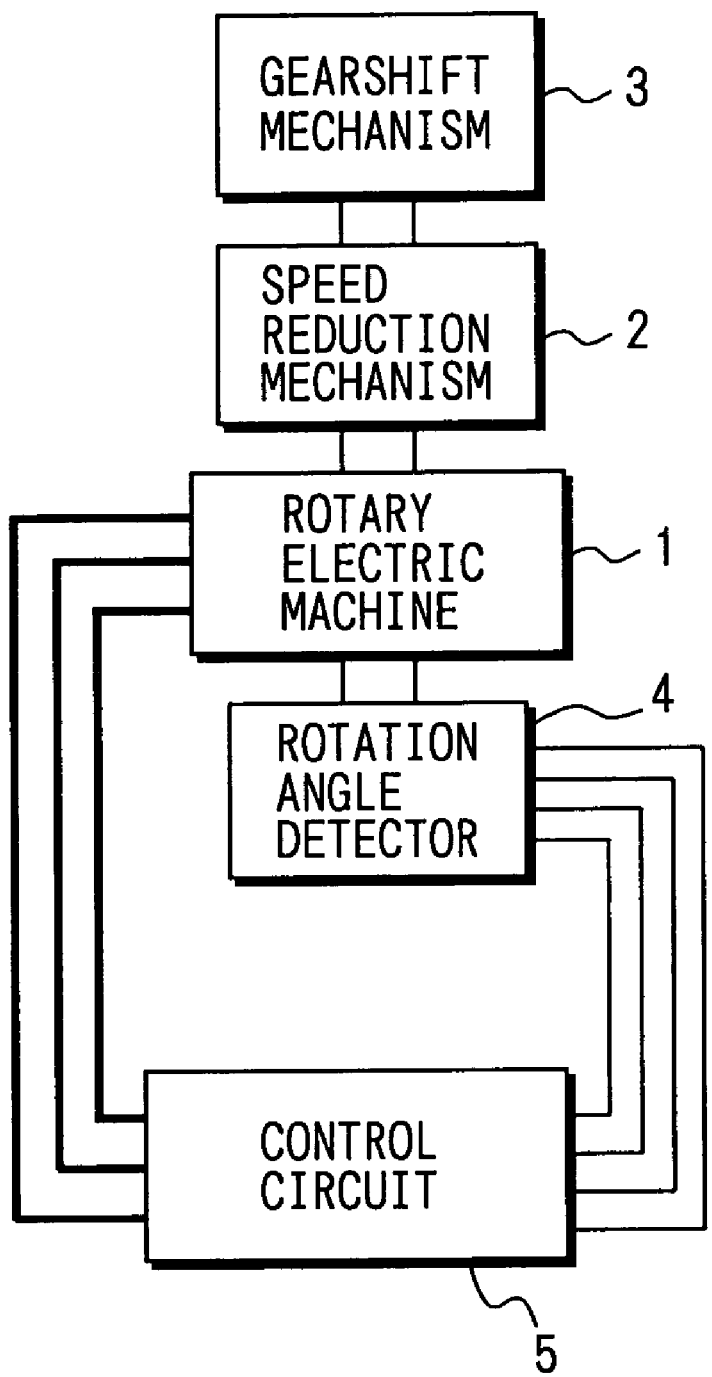
FIG. 2 is a schematic block diagram illustrating a gearshift system.

As shown in FIG. 2, the gearshift control unit includes the rotary electric machine 1, a speed reduction mechanism 2, a gearshift mechanism 3, a rotation angle detector 4 and a control circuit 5. The control circuit 5 controls the rotation angle of the rotary electric machine 1 by the rotation angle detector 4, thereby controlling the gearshift mechanism 3 that is driven via the speed reduction mechanism 3.

Figure 3:
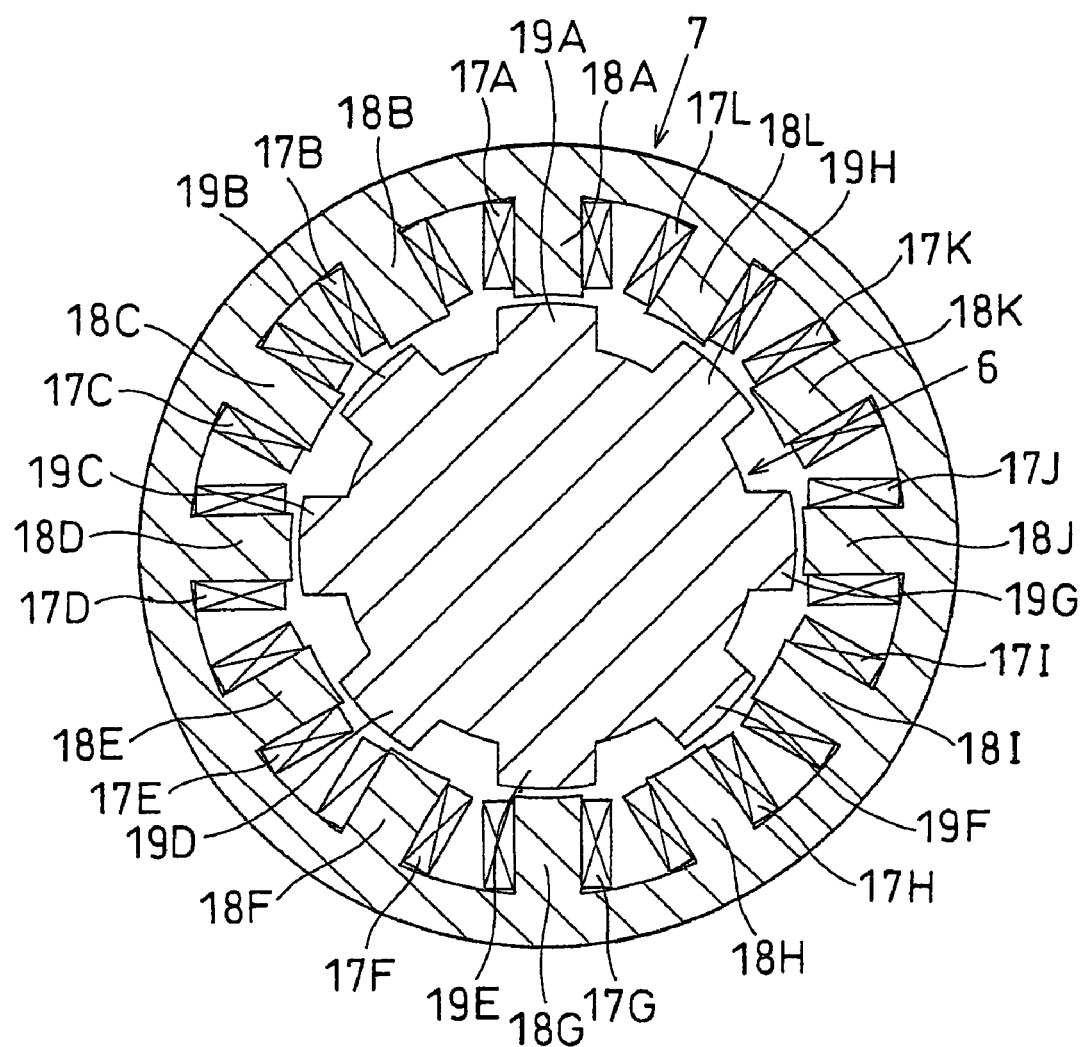
FIG. 3 is a schematic plan view of a rotary electric machine according to the preferred embodiment of the invention.
Figure 4:
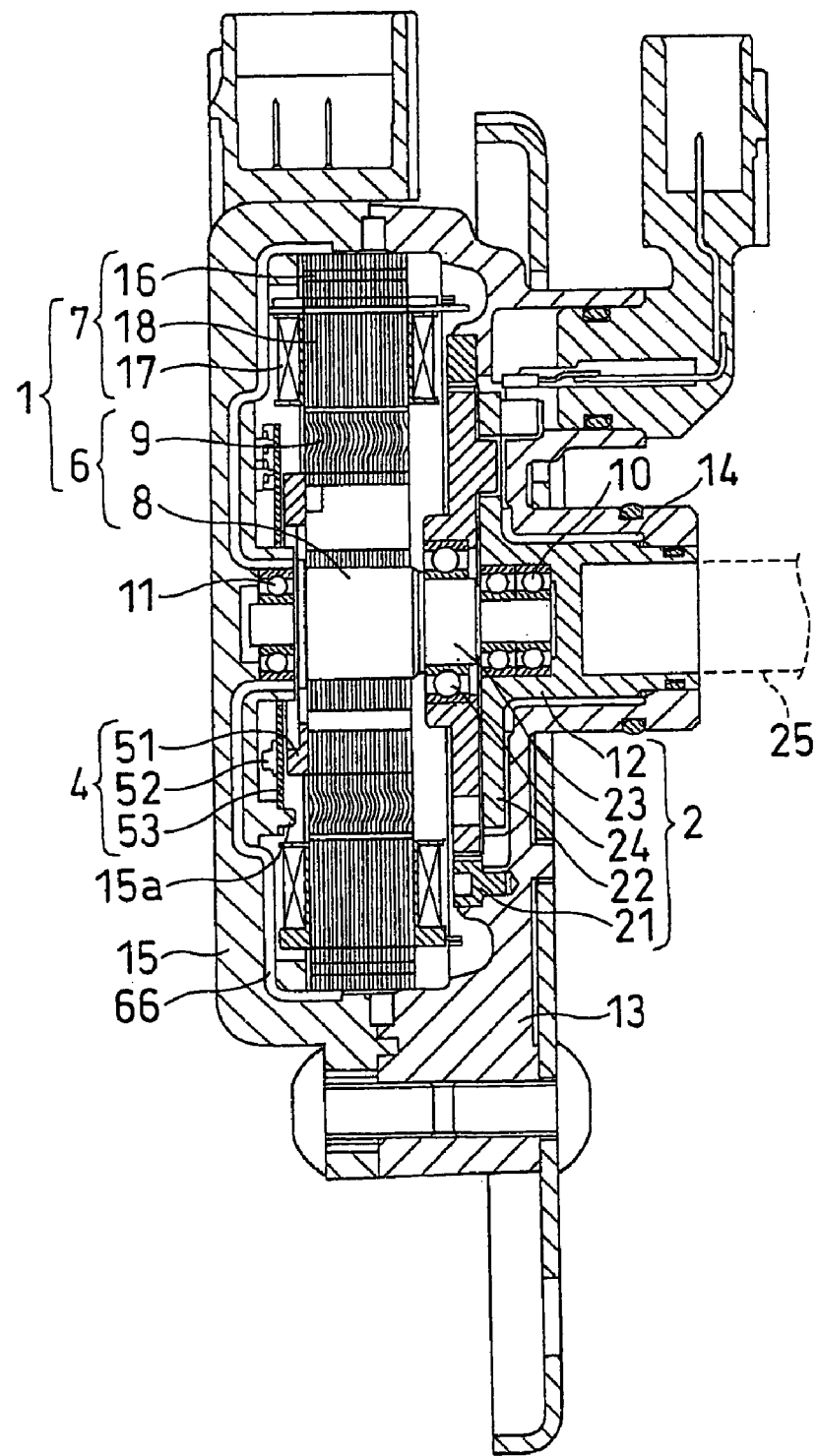
FIG. 4 is a cross-sectional side view of a gearshift control unit that includes the rotary electric machine, a gearshift control unit and a rotation angle detector.

The rotary electric machine 1 is a synchronous motor that drives the gearshift mechanism 3. As shown in FIGS. 3 and 4, the rotary electric machine 1 includes a rotor 6 and a stator 7, which are disposed to be coaxial to each other.

The rotor 6 is constituted of a rotary shaft 8 and a rotor core 9. The rotary shaft 8 is rotatably supported by a pair of a front (or right) ball bearing 10 and a rear (or left) ball bearing 11. The front ball bearing 10 is disposed in an inner bore of an output shaft 12 of the speed reduction mechanism 2, and the output shaft 12 is rotatably supported by a metal bearing 14 that is disposed in an inner bore of a front housing 13. In other words, the front end of the rotary shaft 8 is supported by the metal bearing 14 via the output shaft 12 and the front ball bearing 10. On the other hand, the rear ball bearing 11 is fixed to a rear housing 15 to rotatably support the rear end of the rotary shaft 8.

The stator 7 is constituted of a stator core 16 and coils 17. The stator coil 17 includes a plurality (e.g. 12) of phase coils 17A–17L. The stator coil 17 is divided into two groups. The first group includes phase coils that respectively generate output voltages, which are generated in the order of U→V→W→U'→V'→W' in phase and the second group includes phase coils that respectively generate output voltages which are also generated in the order of U→V→W→U'→V'→W' in phase.

On the other hand, the rotor core 9 has a plurality of salient poles 19A–19H that are circumferentially spaced apart from each other at 45 degree in angle. If current is supplied to the stator coil 17 in the order of W→V→U in phase, the rotor 6 rotates counterclockwise. On the other hand, the rotor 6 rotates clockwise if current is supplied to the stator coil 17 in the order of U→V→W in phase. The rotor 6 turns by 45 degrees each time current is supplied to each of the phase coils.

The speed reduction mechanism 2 is a cycloid speed reduction mechanism. As shown in FIG. 4, it is constituted of an internal gear 21, an external gear 22 and the output shaft 12. The internal gear 21 is fixed to the front housing 13. The external gear 22 has less teeth than the internal gear 21. The external gear 22 is rotatably supported by an eccentric portion of the rotary shaft 8 via a bearing 24 so that the external gear 22 eccentrically rotates as the rotary shaft 8 rotates. Therefore, the rotation speed of the external gear 22 that is reduced from the rotation speed of the rotor shaft 8 is transmitted to the output shaft 12. The output shaft 12 is connected to a control rod 25 of the gearshift mechanism 3.

Figure 5:
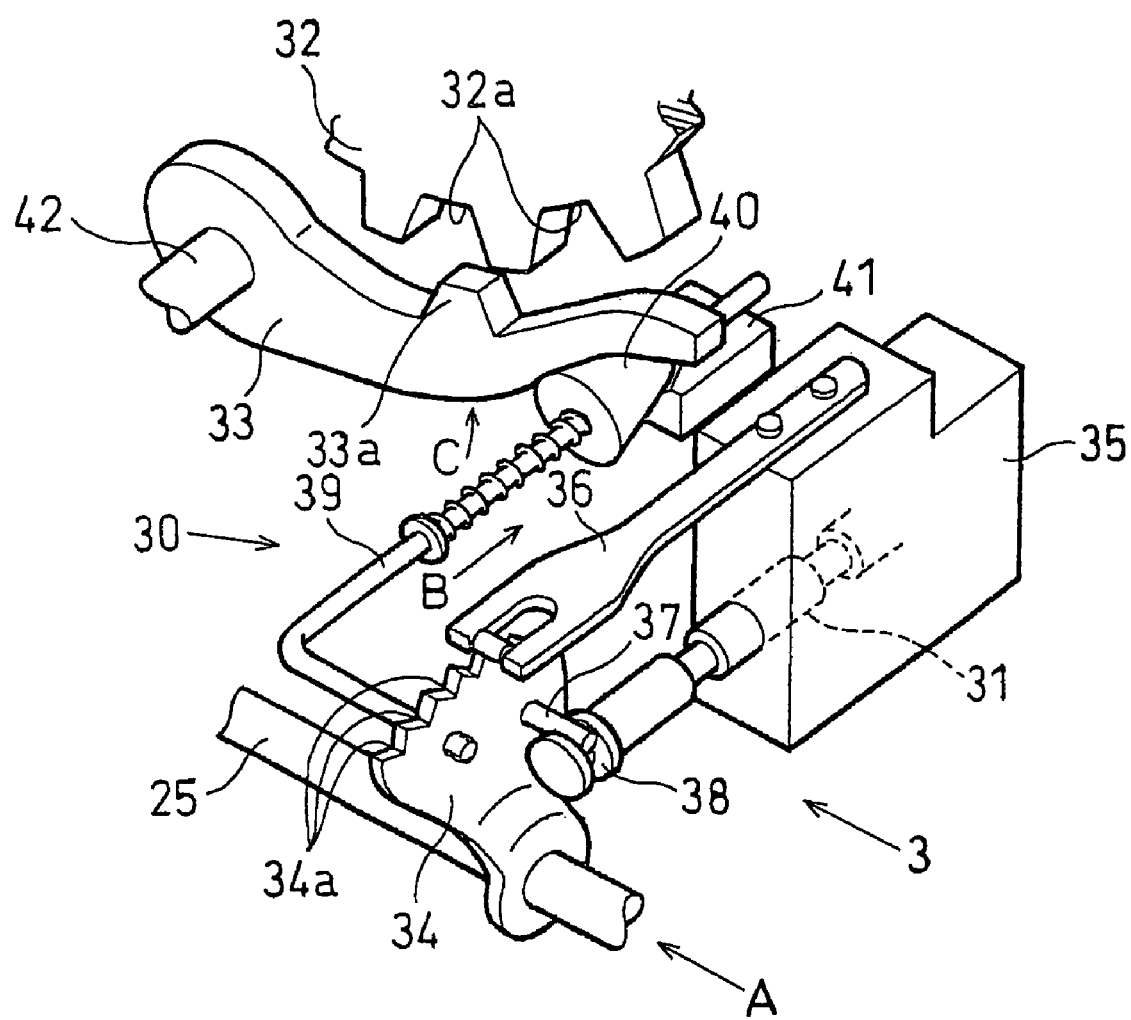
FIG. 5 is a perspective view of the gearshift mechanism with a parking mechanism.

The gearshift mechanism 3 is driven by the output shaft 12. As shown in FIG. 5, gear shifting from one of gearshift ranges P, R, N and D to another is carried out by reciprocating a manual spool valve 31. Locking or unlocking of the parking mechanism 30 is carried out by engaging or disengaging a projection 33a of a park pole 33 with or from a recess 32a of a parking gear 32. The parking gear 32 is connected to vehicle drive wheels via a differential gear (not shown). If the parking gear 32 is locked, the drive wheels are locked.

The control rod 25 has a fan-shaped detent plate 34, which is fixed to the control rod 25 by a spring pin or the like. The detent plate 34 has a plurality of notches 34a, and a blade spring 36 which is fixed to a oil pressure control box 35 fits in one of the notches 34a to hold the selected gearshift range.

The detent plate 34 has a pin 37 for driving the spool valve 31. The pin 37 engages an annular groove 38 that is formed at an end of the manual spool valve 31. When the detent plate 34 is turned by the control rod 25, the pin 37 is moved in an arc, so that the manual spool valve 31 reciprocates in the oil-pressure control box 35. If the control rod 25 rotates clockwise when it is viewed from position A in FIG. 5, the pin 37 pushes the manual spool valve 31 into the pressure control box 35 to change pressure-oil passages so that the gear shifting can be carried out in the order of D, N, R and P. That is, the automatic transmission changes the gearshift range in the order of D, N, R and P.

On the other hand, the pin 37 pulls the manual spool valve 31 to change the gearshift range in the order of P, R, N and D, if the control rod 25 rotates counterclockwise. That is, the automatic transmission changes the gearshift range in the order of P, R, L and D.

The parking rod 39, which is fixed to the detent plate 34, has a conical head 40 between a projection 41 of a transmission housing and the parking pole 33.

If the control rod 25 rotates clockwise to change the gear range from R to P, the parking rod 39 moves in direction B, so that the conical head raises the parking pole 33. Accordingly, the parking pole 33 turns about an axis 42 in the direction indicated by an arrow C, so that the projection 33a of the parking pole 33 fits in one of the notches 32a of the parking gear 32. Thus, the parking mechanism 30 can locks the vehicle in the parking range.

If the control rod 25 rotates counterclockwise to change the range from P to R, the parking rod 39 is moved opposite the direction indicated by the arrow B, so that the biasing force that raises parking pole 33 disappears. Because the parking rod 33 is biased opposite the direction indicated by an arrow C, the projection 33a of the parking pole 33 disengages from the notches 32a of the parking gear 32. As a result, the parking gear 32 becomes free, and the parking mechanism 30 unlocks the vehicle from the parking range.

As shown in FIG. 4, the rotation angle detector 4, which is an incremental type encoder, includes a permanent magnet 51 and a magnetic flux change detector unit 52. The magnetic flux change detector 52 is fixed to the rear housing 15 and includes first to third detecting elements 52a, 52b, 52z.

Figure 6:
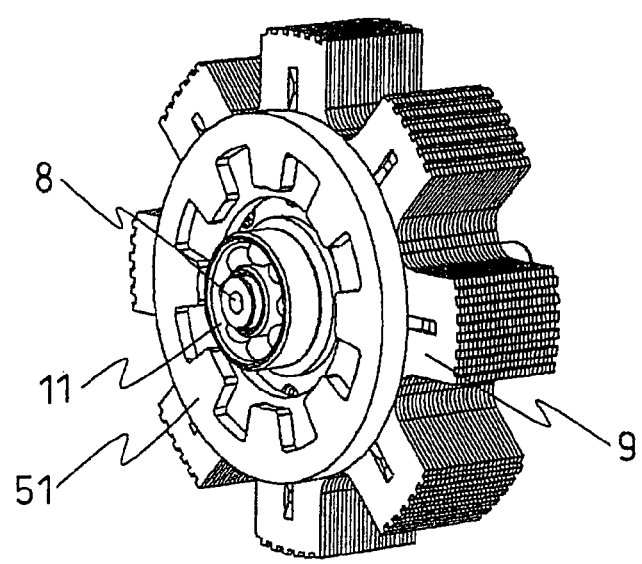
FIG. 6 is a perspective view of a rotor with a permanent magnet fixed thereto.
Figure 7:
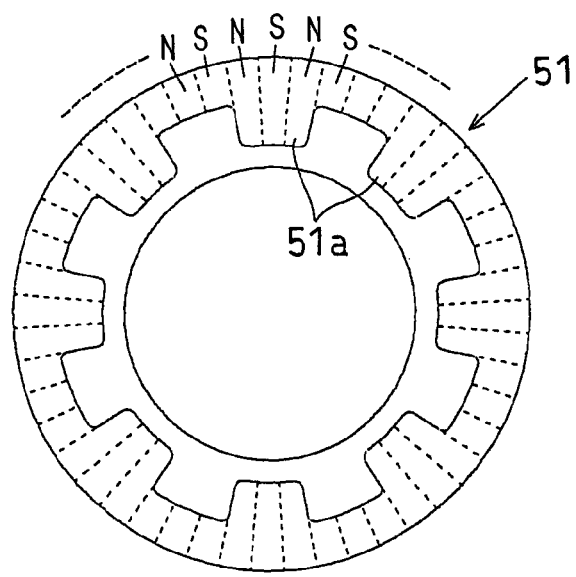
FIG. 7 is a plan view of the permanent magnet being magnetized.
Figure 8A:
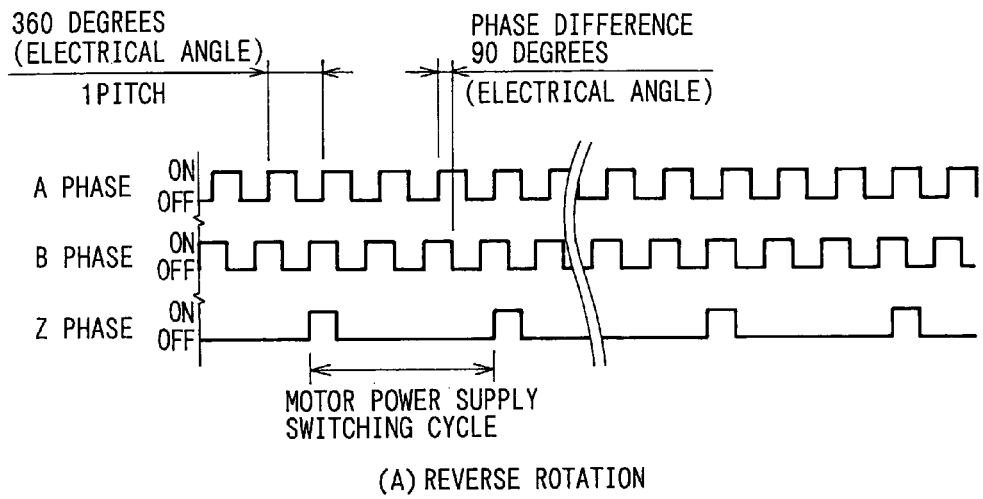
FIG. 8A and FIG. 8B are wave form charts of output signals of first, second and third detecting elements.
Figure 8B:
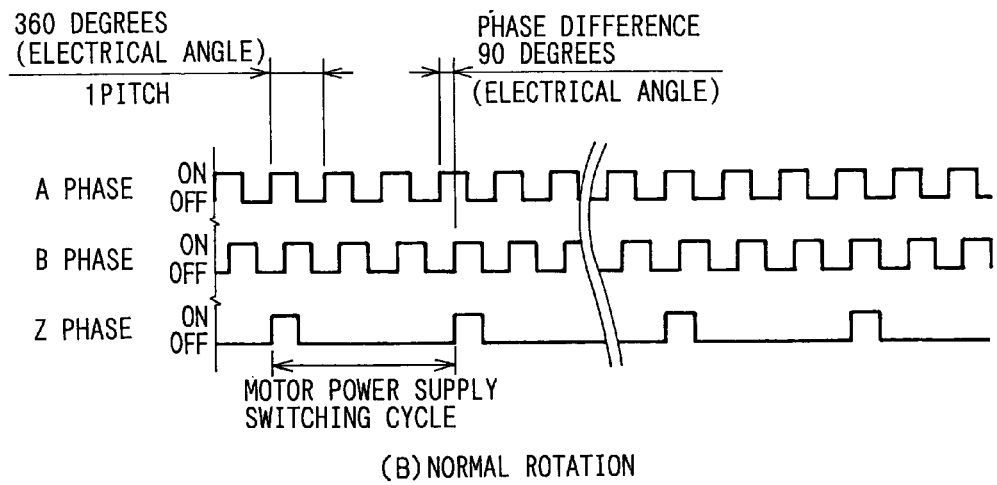

As shown in FIG. 6, the permanent magnet 51 is a ring-shaped plate that is fixed to the rotor 6 to be coaxial with the rotary shaft 8. As shown in FIG. 7, the permanent magnet 51 is magnetized to have a plurality of N and S poles alternately formed in the circumferential direction at angular intervals of 7.5 degrees so that the magnetic flux flowing in radial directions from the N-poles can return to the S-poles. Accordingly, A-phase output signal and B-phase output signal are provided, so that an accurate rotation angle of the rotor 6 can be detected.

The permanent magnet 51 has a plurality of inwardly projecting internal teeth 51a at 45 degree-intervals and an outwardly projecting external tooth 51b. The central portion of each internal tooth 51a is magnetized to form an S-pole, and the circumferentially opposite sides of the central portion are magnetized to form N-poles. The internal teeth 51a provides Z-phase output signal for providing a signal in synchronism with the rotary electric machine 1.

The first to third detecting elements 52a, 52b and 52z are elements of the magnetic flux change detector 52 are elements for detecting magnetic flux change such as hall ICs, hall elements or MR(magneto-resistive)-ICs fixed to a circuit board 53, as shown in FIGS. 9A and 9B.

The first and the second detecting elements 52a, 52b are disposed along a circle to respectively detect flux changes of a radially outer portion of the permanent magnet 51, thereby providing the A-phase and the B-phase output signals. The third detecting element 52z is disposed on a portion opposite the internal teeth 51a to detect a flux change of a radially inner portion of the permanent magnet 51 that includes the internal teeth 51a, thereby providing the Z-phase output signal or the index signal.

The A-phase output signal and the B-phase output signal are signals that are 90 degrees in phase different from each other. That is, the pair of output signals can be provided each time the rotor 6 turns 15 degrees in mechanical angle.

The Z-phase output signal is provided each time the rotor 6 turns 45 degrees in mechanical angle to define the turn-on timing and the relative position between the U, V, W-phase voltages and the A-phase, B-phase output signals.

As shown in FIG. 4, the magnetic flux change detector 52 is disposed on the rear surface of the circuit board 53, which is away from the permanent magnet 51, to be covered by the rear housing 15. A protecting layer, such as a sealer or a coating, is formed on the rear surface of the circuit board 53 to protect the flux change detector 52 and a circuit pattern 54.

The circuit board 53 is constituted of a non-magnetic metal plate 56 (e.g. aluminum, stainless steel, etc.) and a film board 57 made of an insulation resin (e.g. polyimide). The film board 57 is disposed on the rear surface of the circuit board 53, and the circuit pattern 54 is formed on the other surface of the circuit board 53.

A plurality of sensor terminals 58 is insert-molded in the rear housing 15 to electrically connect the control circuit 5 and the circuit board 53 of the rotation angle detector 4. The sensor terminals 58 are connected to the control circuit 5 at one ends and to the circuit board 53 at the other ends. The sensor terminals 58 extends straight toward the circuit board 53, as shown in FIG. 10.

On the other hand, the metal plate 56 is not formed on the portion (hereinafter referred to as the leading film) 57a of the film board 57 below line A, as shown in FIG. 9A. The leading film 57a is folded at line X—X, so that the tip of the leading film 57a is connected to the sensor terminals 58, as shown in FIGS. 10A and 10B. Thus, soldering lands 57b are formed on the surface of the film board 57 in the same plane as the circuit pattern 54.

Figures 11A, 11B:
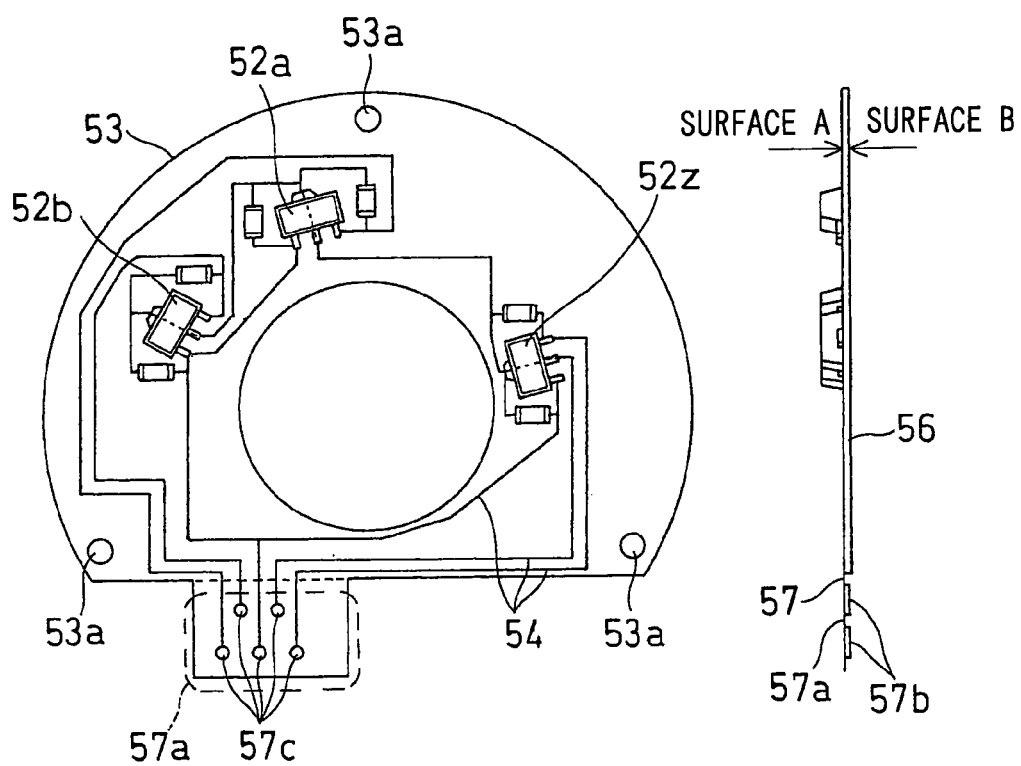
FIG. 11A is a schematic plan view of a printed board.
FIG. 11B is a side view of the printed circuit board.

FIG. 11 shows a modified leading film 57a that is not folded. A plurality of through holes 57c is formed so that the sensor terminals 58 can be connected through the holes 57c. In this case, it is necessary to form the soldering lands 57b on the surface (surface A) that is different from the surface (surface A) on which the circuit pattern 54 is formed.

A plurality of fixing holes 53a is formed at the peripheral portion of the circuit board 53, and a plurality of resinous projections 15a formed on the rear housing 15 is fitted and thermally fixed to the fixing holes 53a, thereby fixing the circuit board 53 to the rear housing 15.

Figure 12A:
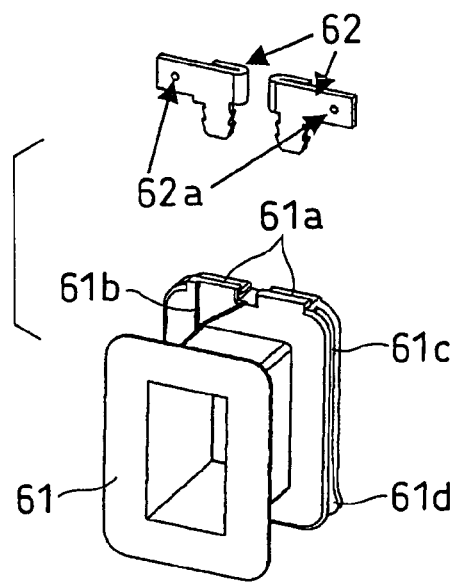
FIGS. 12A, 12B and 12C are perspective views illustrating a coil being assembled.
Figure 12B:
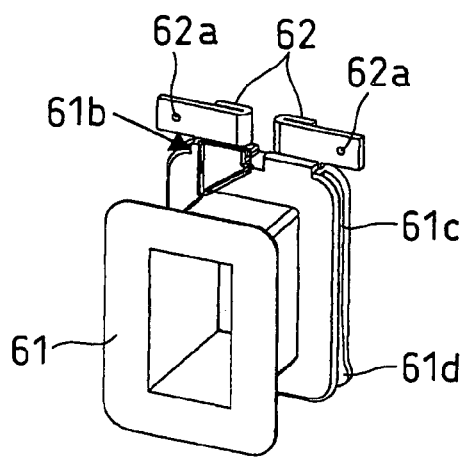
Figure 12C:
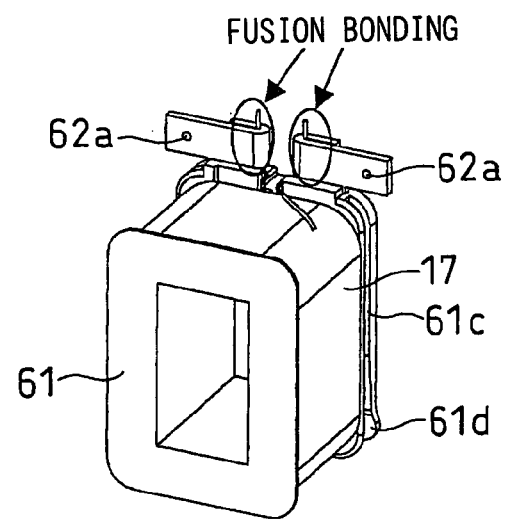

As shown in FIGS. 12A, 12B and 12C, the stator coil 17 is constituted of an insulating bobbin 61 and an enameled wire wound around the bobbin 61. The stator coil 17 is fitted to each of the stator teeth 18. A pair of recesses 61a is formed in the bobbin 61, and a pair of bobbin terminals 62 is inserted therein. Each of the bobbin terminals 62 has a projection 62a that projects toward a contact surface of the stator terminal 63 so as to bring the bobbin terminals 62 in contact with the stator terminals 63 effectively. As shown in FIGS. 12A and 12B, the bobbin 61 has a groove 61b for holding the starting end of the enameled wire to be wound. As shown in FIG. 12C, opposite ends of enameled wire of the stator coil 17 are electrically connected by fusing or the like to the pair of bobbin terminals 62a.

Figure 13A:
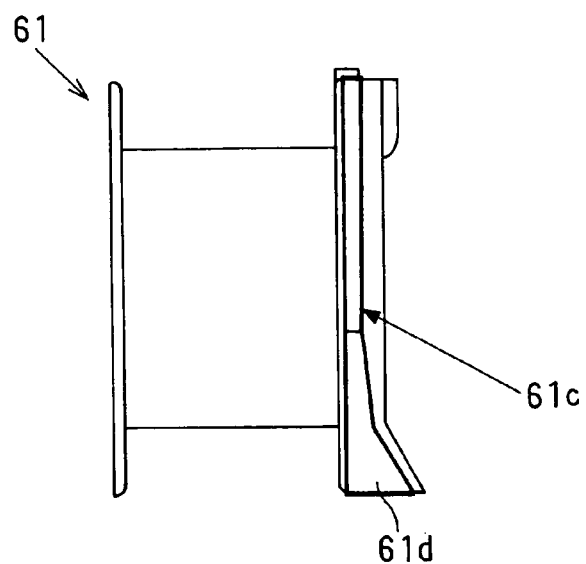
FIGS. 13A and 13B are schematic diagram illustrating a bobbin having a terminal groove.
Figure 13B:
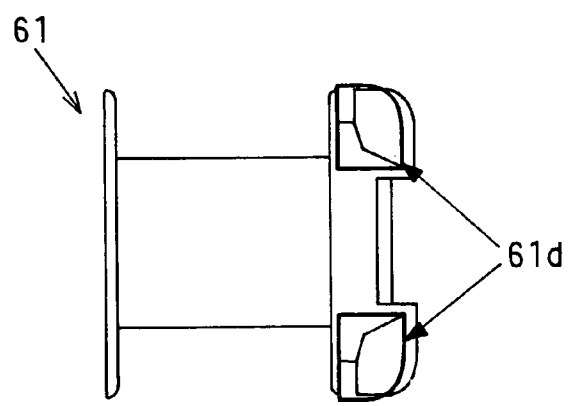

As shown in FIGS. 13A and 13B, a pair of terminal grooves 61c for holding the stator terminals 63 are formed. The stator terminals 63 are inserted into the terminal grooves 61c when the stator core 16 is assembled into the rear housing 15.

Each of the terminal grooves 61c has a terminal guide 61d that opens to receive the stator terminals 63. Accordingly, the ends of the stator terminals 63 are smoothly inserted into the grooves when the stator core 16 is assembled to the rear housing 15.

Figure 14:
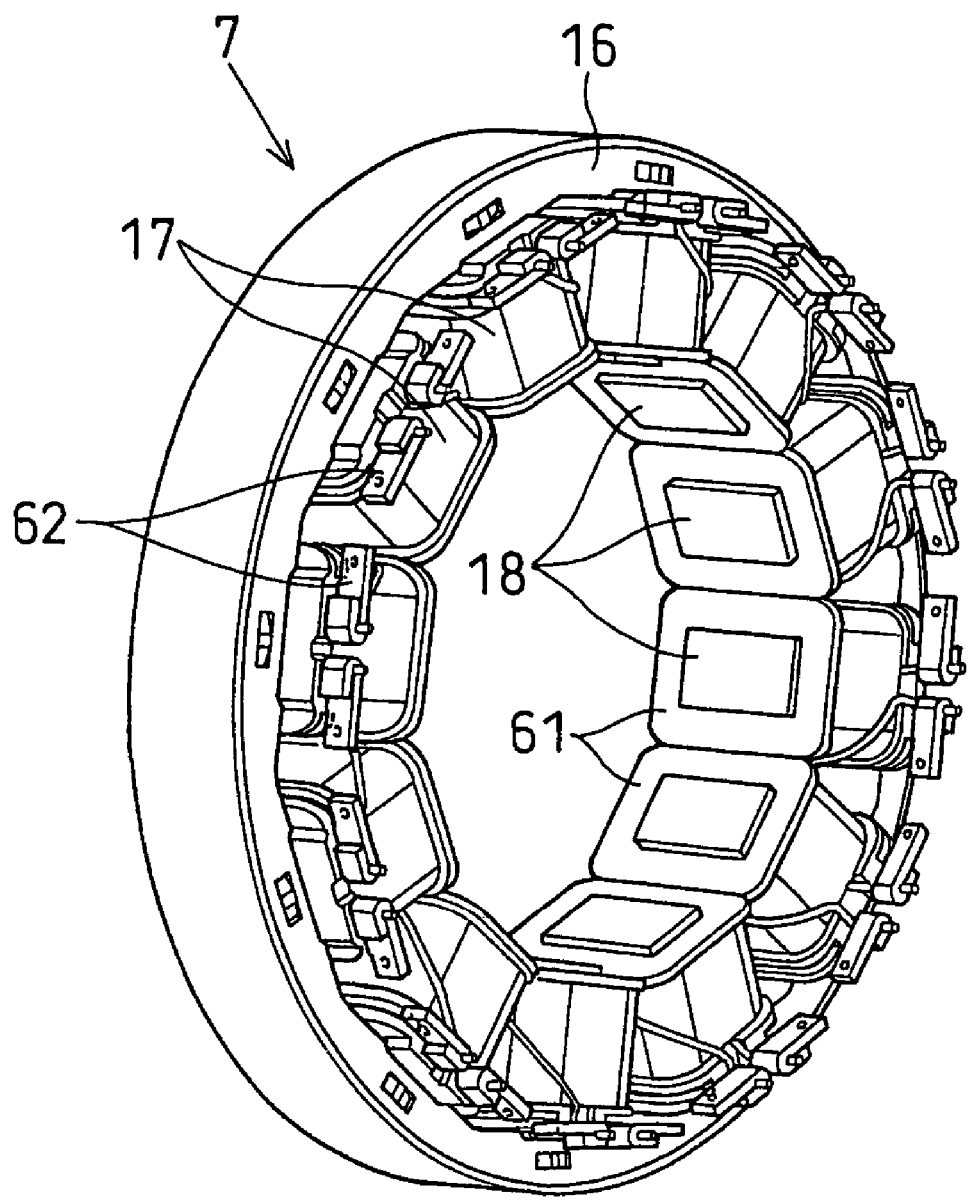
FIG. 14 is a perspective view illustrating the stator.

As shown in FIG. 14, bobbins 61 with the coil are respectively fitted to the teeth 18 of the stator core 16 which is a laminate of a plurality of thin magnetic plates. Thus, the stator 7 is completed.

As shown in FIGS. 15–20, a plurality of stator terminals 63 is insert-molded, as a resinous insert mold 64, into the rear housing 15. The stator terminals 63 are brought in contact with the bobbin terminals 62 when the stator core 16 together with the stator coil 17 is assembled to the rear housing 15.

Figure 15:
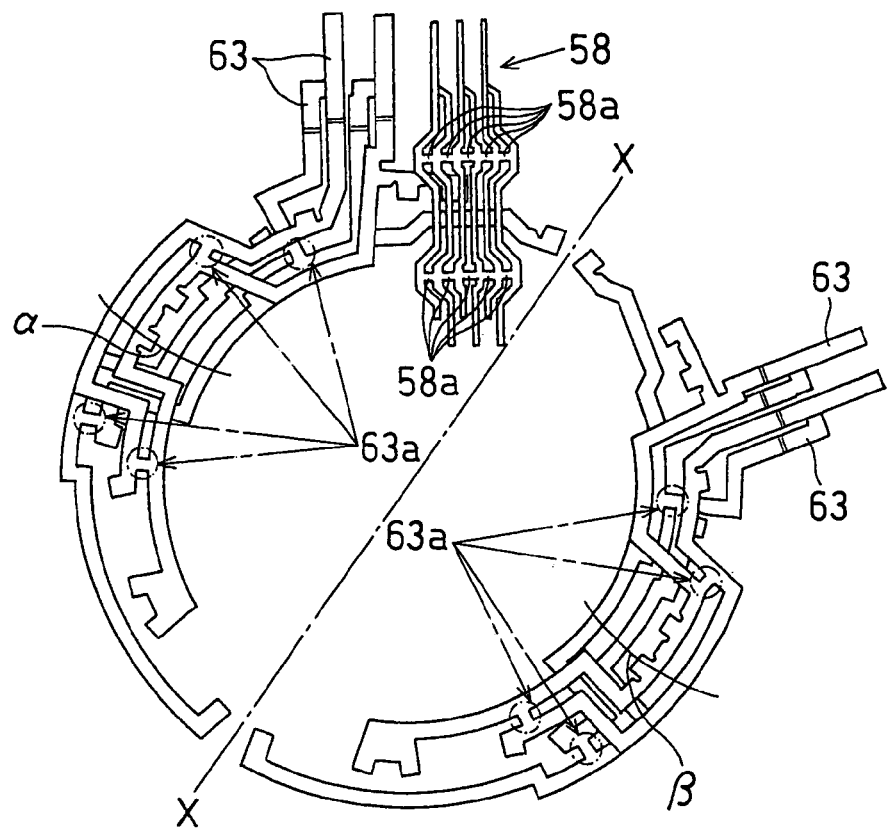
FIG. 15 is a schematic diagram illustrating stator terminals and sensor terminals.
Figure 17:
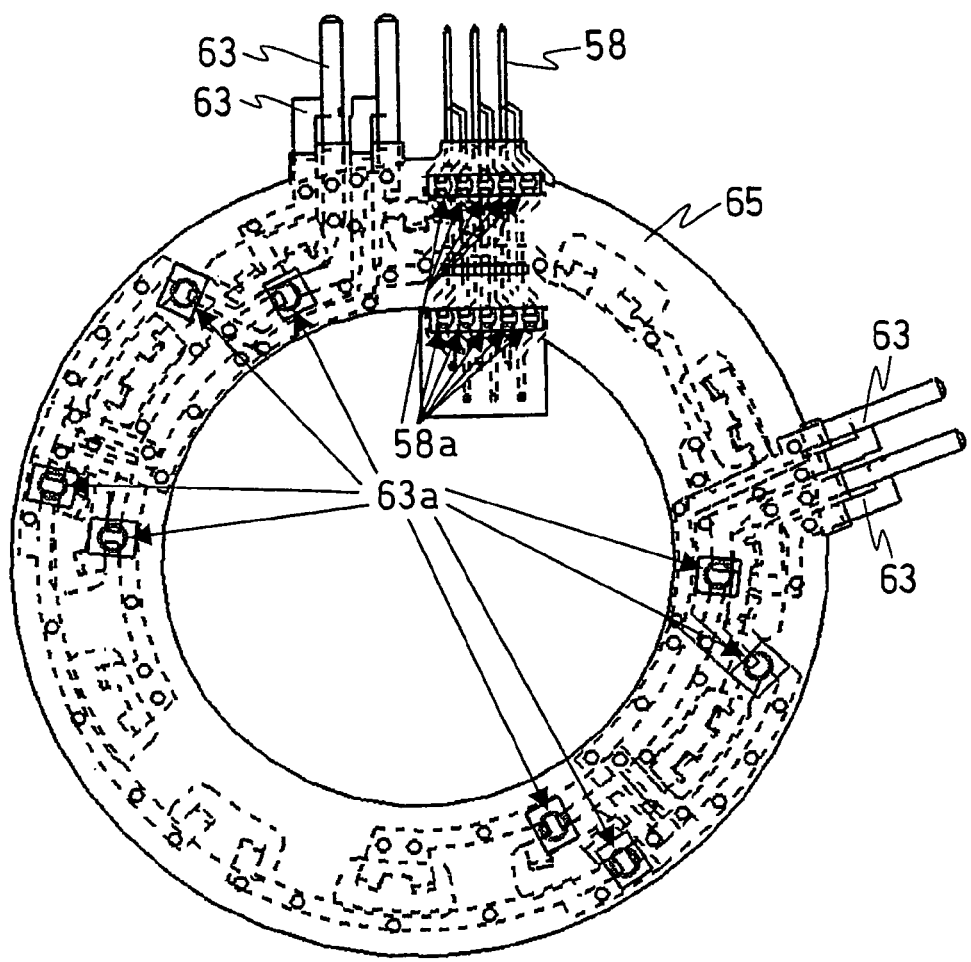
FIG. 17 is a schematic plan view illustrating a resinous frame with the stator terminals and the sensor terminals.
Figure 18:
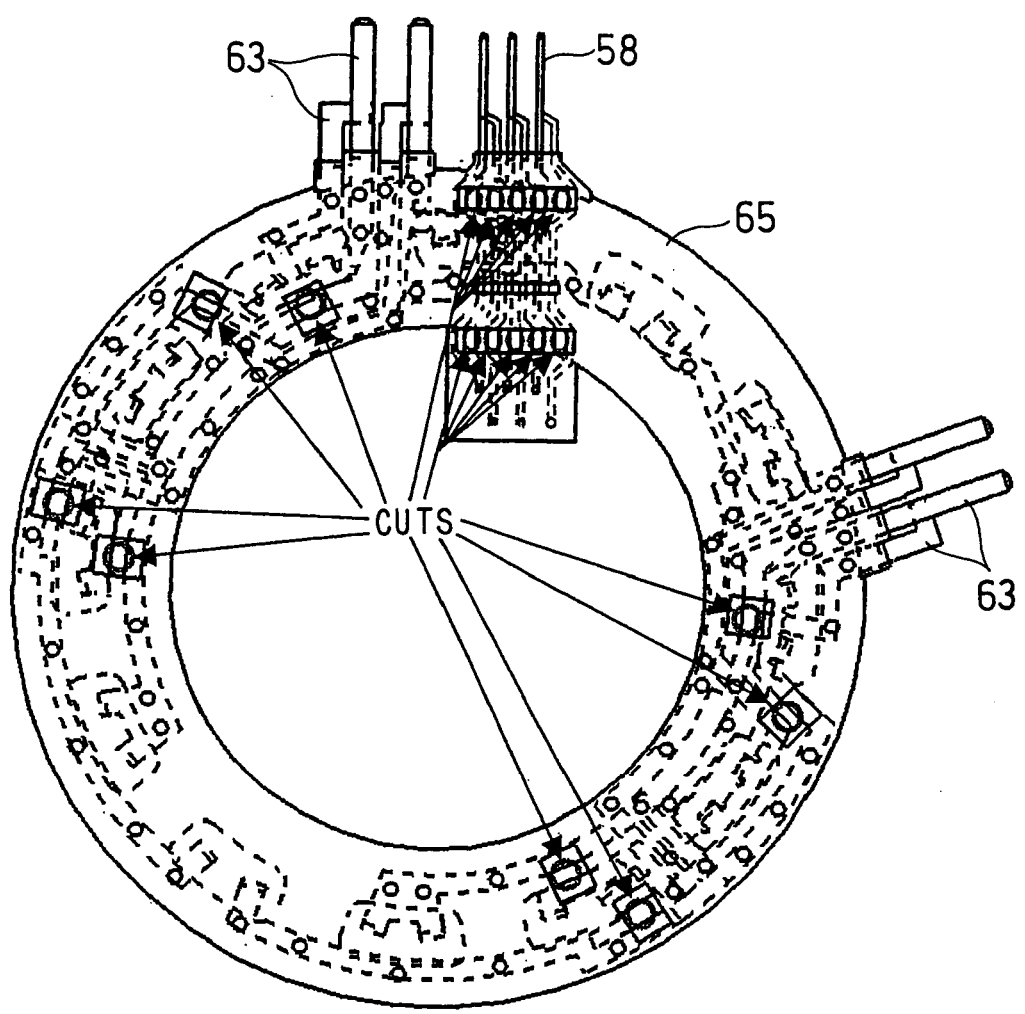
FIG. 18 is a schematic plan view illustrating the resinous frame with the stator terminals and the sensor terminals after bridge portions are cut.

As shown in FIGS. 17 and 18, the stator terminals 63 are assembled into a ring-shaped resinous frame 65, which is insert-molded into the rear housing 15. A plurality (e.g. 8 pieces) of the stator terminals 63 is punched out from a metal plate and shaped into a prescribed pattern beforehand. Each pair of pieces is connected by a bridge portion 63a and four pairs of the stator terminals 63 are grouped into two groups, the first terminal group α and the second terminal group β, which are packed or assembled, as shown in FIG. 15. As described above, the stator coil 17 is constituted of two groups of phase coils, the first coil group and the second coil group, each of which has phase coils that are circumferentially disposed in the order of U, V, W, U', V' and W'.

The first terminal group α and the second terminal group β are disposed to be symmetric with respect to diametric line X—X of the contour of the packed stator terminals 63. Therefore, the stator terminals 63 of each group can be punched out by the same mold tools.

The packed stator terminals 63 are molded into the resinous frame 65, as shown in FIG. 17, and separated from each other by cutting the bridge portions 63a, as shown in FIG. 18.

Figure 16:
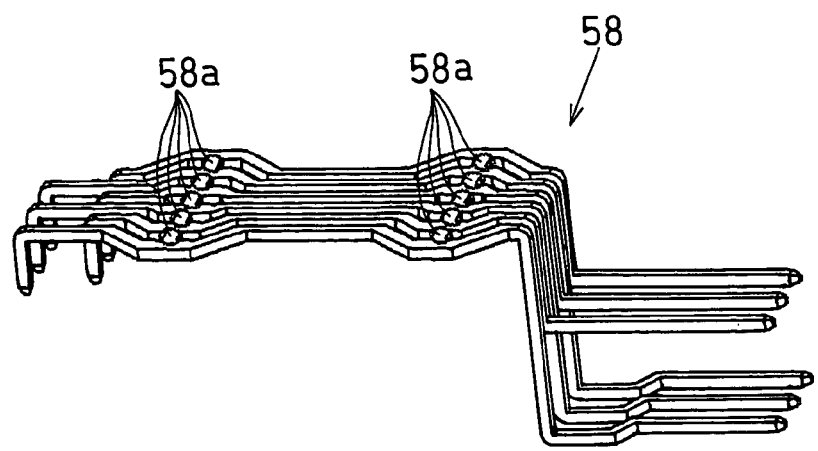
FIG. 16 is a perspective view illustrating the sensor terminals.

The sensor terminals 58 that are connected to the circuit board 53 of the rotation angle detector 4 are also assembled to the resinous frame 65, as shown in FIGS. 17 and 18. A plurality (e.g. 6 pieces) of the sensor terminals 58 is punched out from a metal plate and shaped into a prescribed pattern beforehand. As shown in FIG. 16, all the pieces are connected by bridge portions 58a, which are cut when the bridge portions 63a of the stator terminals 63 are cut, as shown in FIG. 18, after they are molded into the resinous frame 65.

Figure 19:
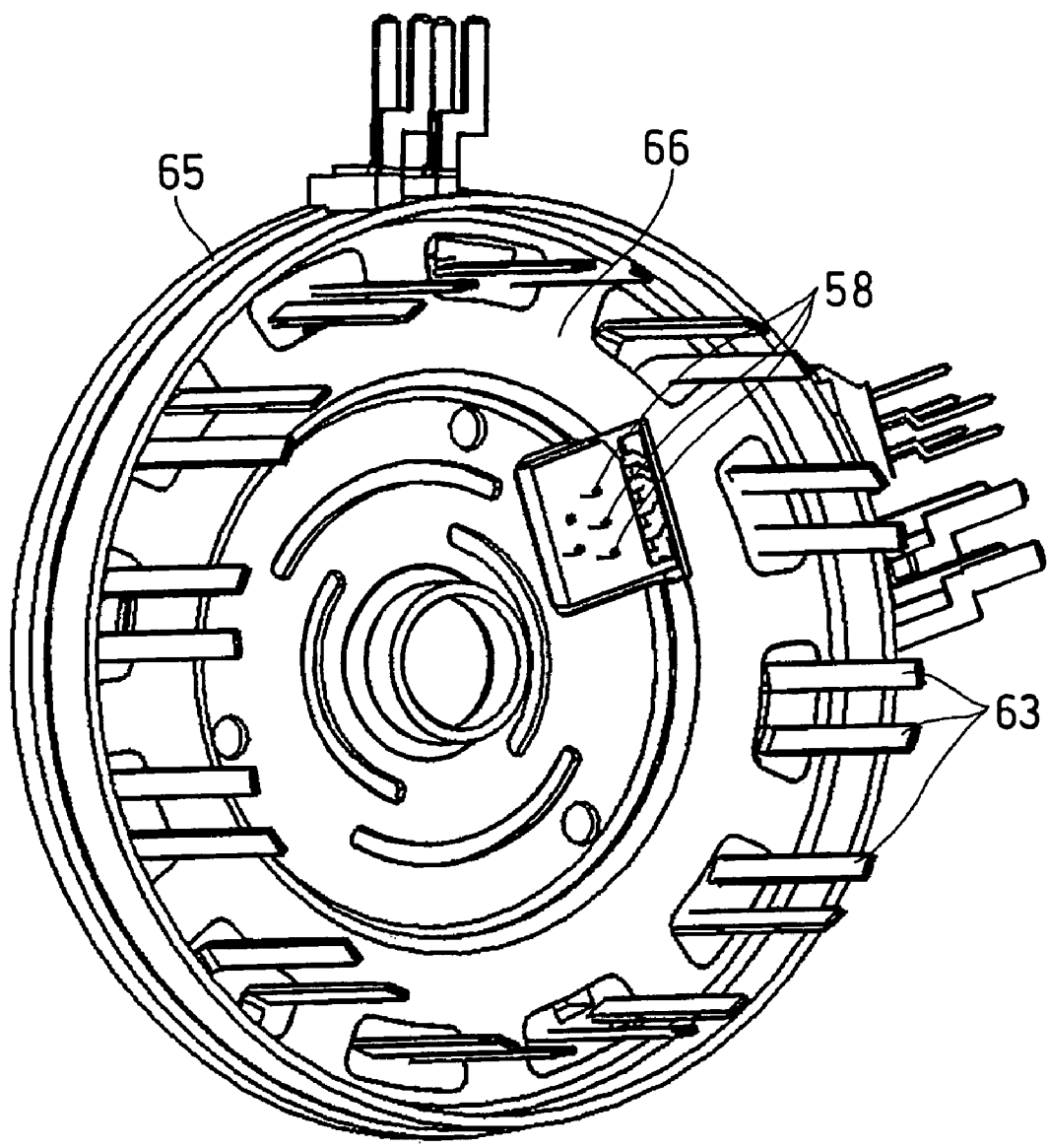
FIG. 19 is a perspective view illustrating the resinous frame with a center boss being fixed thereto.
Figure 20:
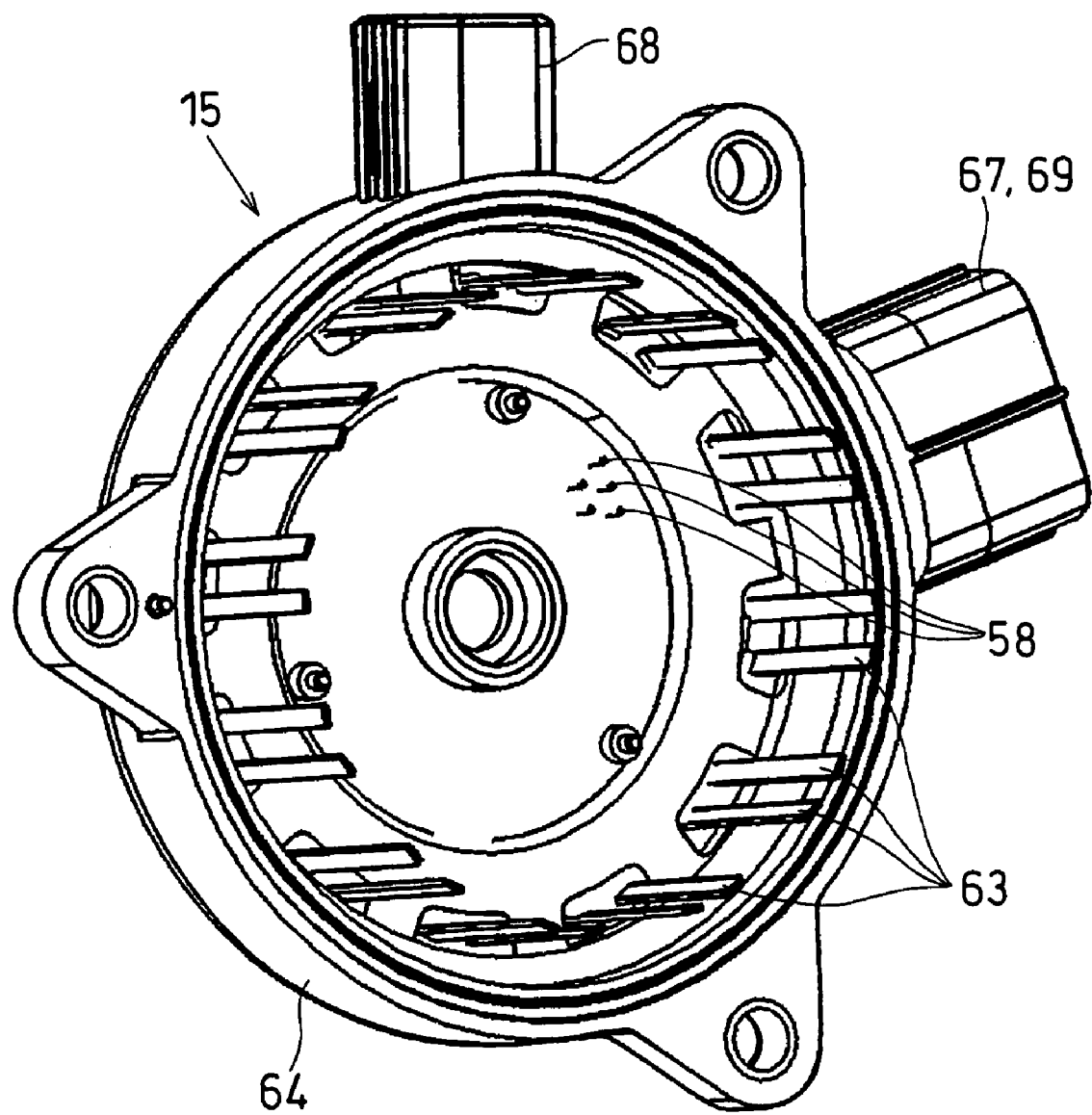
FIG. 20 is a perspective view of the rear housing with a resinous insert mold.
Figure 21A:
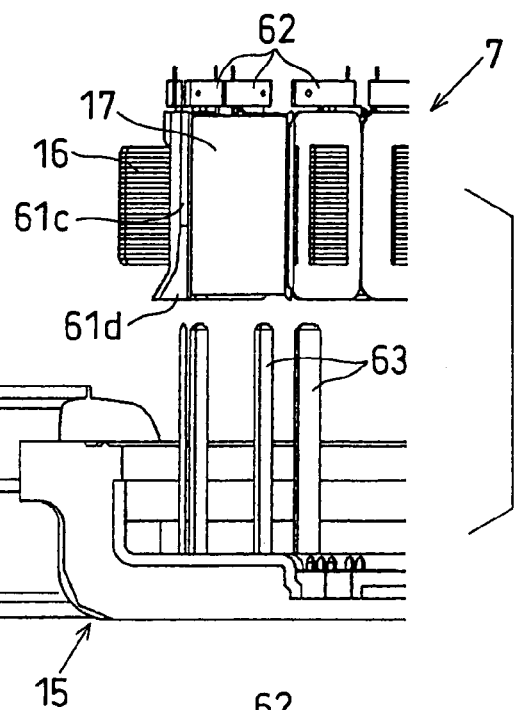
FIGS. 21A, 21B and 21C are schematic diagrams illustrating steps of assembling the stator and a rear housing of the rotary electric machine according to the preferred embodiment.
Figure 21B:
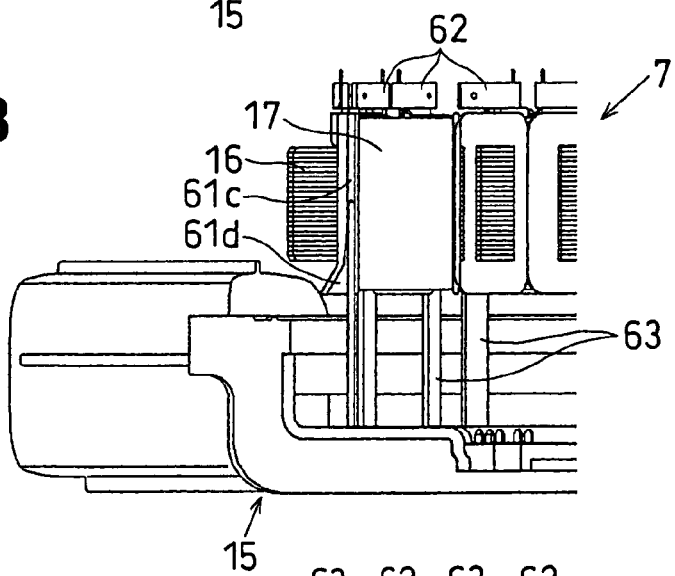
Figure 21C:
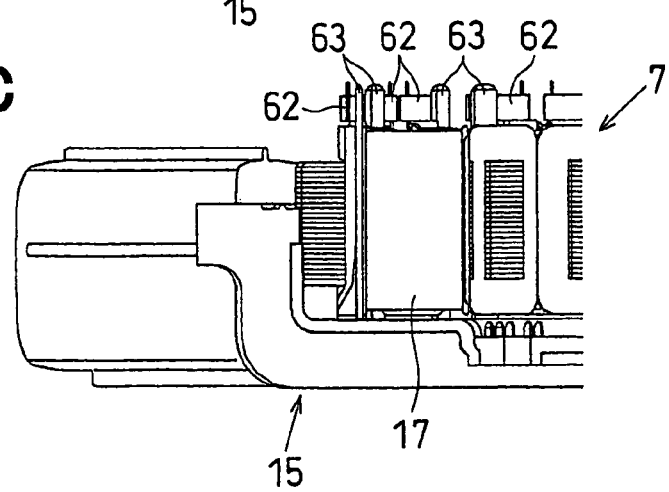
Figure 22:
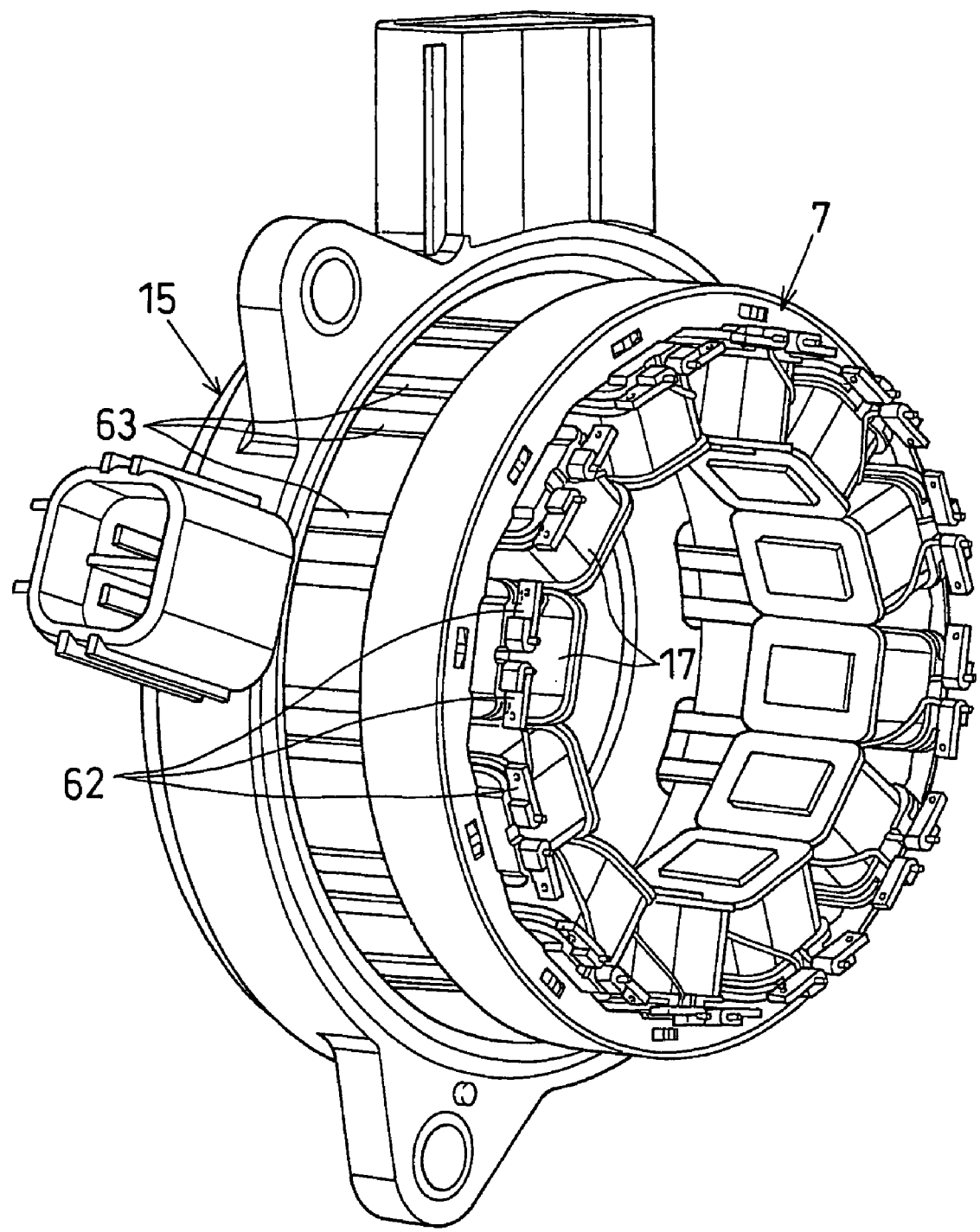
FIG. 22 is a perspective view of the assembly of the stator and the rear housing being assembled.

As shown in FIGS. 19 and 20, the rear housing 15 is constituted of the resinous frame 65b that includes a plurality of the stator terminals 63, a plurality of sensor terminals 58, the rear ball bearing 11, a reinforcement metal plate 66 and a resinous insert mold 64 in which the resinous frame 65 and the reinforcement metal plate are embedded.

In other words, the rear housing 15 includes reinforcement metal plate 66 as well as the resinous frame 65 and the resinous insert mold 64, so that the rotary electric machine 1 can endure very high load. Because the above structure effectively prevents the resinous insert mold 64 from deforming, the air gap between the rotor 6 and the stator 7 can be made comparatively shorter, and the output power of the rotary electric machine 1 is increased.

As shown in FIG. 20, a first coil-connector 67 that connects the first terminal group α to the control circuit 5 and a second coil-connector 68 that connects the second terminal group β to the control circuit 5 are separated from each other. Therefore, the rotary machine 1 can be operated even if electric supply to one of the terminal groups α and β is interrupted. A sensor connector 69 is disposed together with the first coil-connector 67 to reduce the number of the connectors.

Figure 23:
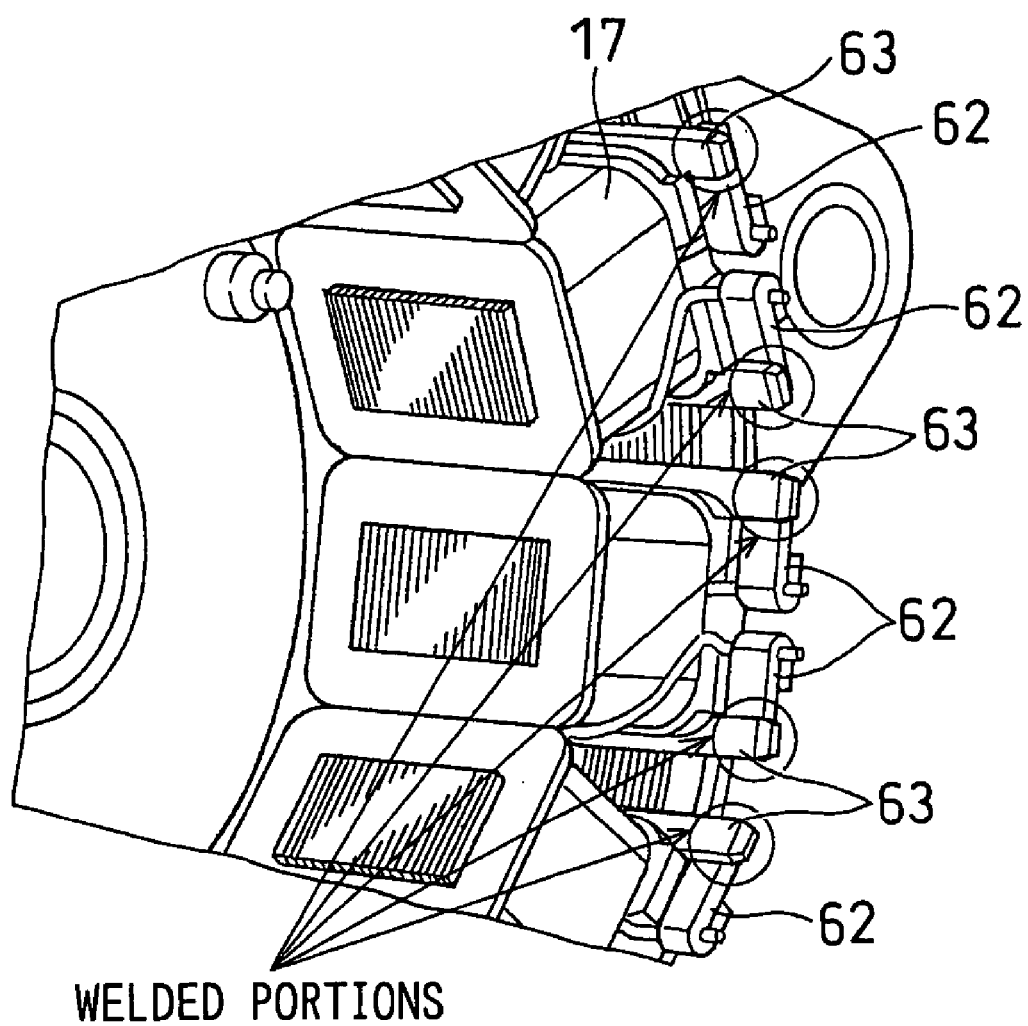
FIG. 23 is a fragmentary perspective view illustrating a portion of the bobbin terminals and the stator terminals being welded together.

As shown in FIGS. 21A–21C and 22, the stator 7 is assembled to the rear housing 15 in a manner that the stator terminals 63, which project from the rear housing 15, can be inserted into the respective terminal grooves 61c. When the stator 7 is completely assembled, the bobbin terminals 62 and the stator terminals 63 are welded to each other at contact portions thereof indicated by circles in FIG. 23.

Figure 1:
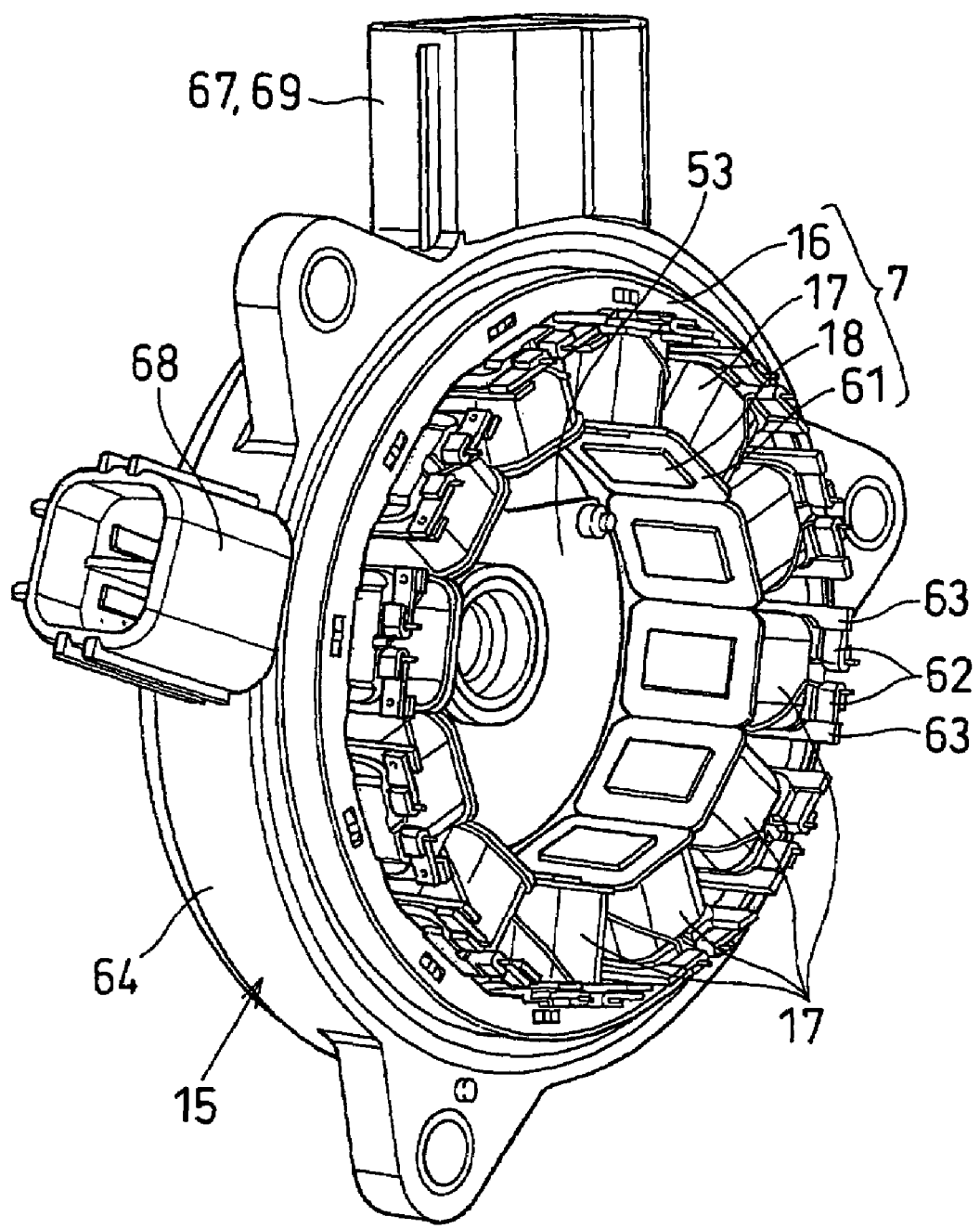
FIG. 1 is a perspective view of a rear housing of a rotary electric machine according to a preferred embodiment of the invention.

Thereafter, the center bore of the rear housing 23 for supporting the rear ball bearing 11 is machined with reference to the outside or inside diameter of the stator 7 to provide an accurate air gap between the rotor 6 and the stator 7. Finally, as shown in FIG. 1, the circuit board 53 of the rotation angle detector 4 is assembled to the rear housing 15.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotary electric machine comprising:
    a stator including a stator core having a plurality of teeth and stator coils mounted on the teeth, each said stator coil including a bobbin that is fitted to one of the teeth and a phase coil wound around the bobbin, each said bobbin including a pair of bobbin terminals respectively connected to opposite ends of the phase coil; and
    a stator housing for accommodating said stator at one side thereof, said stator housing including an insert mold and a plurality of stator terminals extending straight toward said stator from the insert mold, each said stator terminal having a first contact portion;
    wherein each said bobbin terminal has a second contact portion;
    wherein each said bobbin has a pair of terminal grooves formed at one end thereof, each to receive and guide a said stator terminal to near the second contact portion of the respective bobbin terminal; and
    wherein, when said stator is assembled to said stator housing, said stator terminals extend along the respective terminal grooves to automatically pass the respective first contact portions to near the respective second contact portions.

2. The rotary electric machine as claimed in claim 1, wherein each said terminal groove has a widened end opening to receive one of said stator terminals.

3. The rotary electric machine as claimed in claim 1, wherein said plurality of stator terminals is assembled into a resinous frame, and wherein said resinous frame is embedded in said insert mold.

4. The rotary electric machine as claimed in claim 1, wherein said stator housing further comprises a resinous frame embedded in said insert mold to hold said plurality of stator terminals and a metal reinforcement plate for supporting a ball bearing that rotatably supports an end of said rotor.

5. The rotary electric machine as claimed in claim 4, wherein said stator housing has a center bore for supporting said ball bearing, and wherein said center bore has an inside surface the diameter of which is formed with reference to one of an outside diameter and inside diameter of said stator.

6. The rotary electric machine as claimed in claim 1, wherein said plurality of stator coils comprises a first coil group including phase coils disposed in a circumferential direction and a second coil group including phase coils disposed in a circumferential direction, and wherein said plurality of stator terminals comprises a first terminal group and a second terminal group that are disposed to be symmetric to each other with respect to a diametric line of a contour of the assembled stator terminals.

7. The rotary electric machine as claimed in claim 6, wherein said stator terminals are stamped out from a metal plate.

8. The rotary electric machine as claimed in claim 7, further comprising a first connector for connecting said stator terminals of the first terminal group to an outside electric device and a second connector, separated from said first connector, for connecting said stator terminals of the second terminal group to an outside electric device.

9. The rotary electric machine as claimed in claim 1, further comprising a sensor connector for connecting said sensor terminals to an outside electric device, wherein said stator housing further includes rotation angle detector and a plurality of sensor terminals embedded in said insert mold, and wherein said stator terminals and said sensor connector are integrated.

10. A rotary electric machine comprising:
    a stator core having a plurality of teeth and bobbins respectively fitted to the teeth;
    a plurality of phase coils respectively wound around said bobbins, each said bobbin including a pair of bobbin terminals to which opposite ends of one of said phase coils are connected; and a stator housing for accommodating said stator core and said phase coils, said stator housing including a plurality of stator terminals extending straight toward said stator core, each said stator terminal having a first contact portion at an end thereof; wherein each said bobbin terminal has a second contact portion in contact with the first contact portion, and each said bobbin has a pair of terminal grooves formed at one end thereof near said pair of bobbin terminals to receive said stator terminals so as to automatically pass each said first contact portion to near the respective second contact portion.

11. A method of manufacturing a rotary electric machine that includes a stator core having a plurality of teeth and stator coils mounted on the teeth and a stator housing having a plurality of stator terminals extending toward the stator core to be connectable to an outside electric device, said method comprising the steps of:

winding a phase coil around bobbins, each of which has a pair of bobbin terminals and a pair of grooves, each for receiving a respective stator terminal;

respectively connecting opposite ends of each phase coil to the bobbin terminals of each pair;

fitting each bobbin to one of the teeth of said stator core; and assembling the stator core into stator housing to insert the stator terminals into the grooves of the bobbins so that each said bobbin terminal is brought in contact with one of the stator terminals.

12. The rotary electric machine as claimed in claim 1, wherein a pair of recesses is formed in each said bobbin, each for receiving a respective said bobbin terminal.

13. The rotary electric machine as claimed in claim 1, wherein each said bobbin terminal includes a projection projecting towards said first contact surface thereby to define said second contact surface/portion.

14. The rotary electric machine as claimed in claim 1, wherein the bobbin terminals and stator terminals are welded to each other at said contact portions thereof.

* * * * *